UNITED STATES PATENT OFFICE.

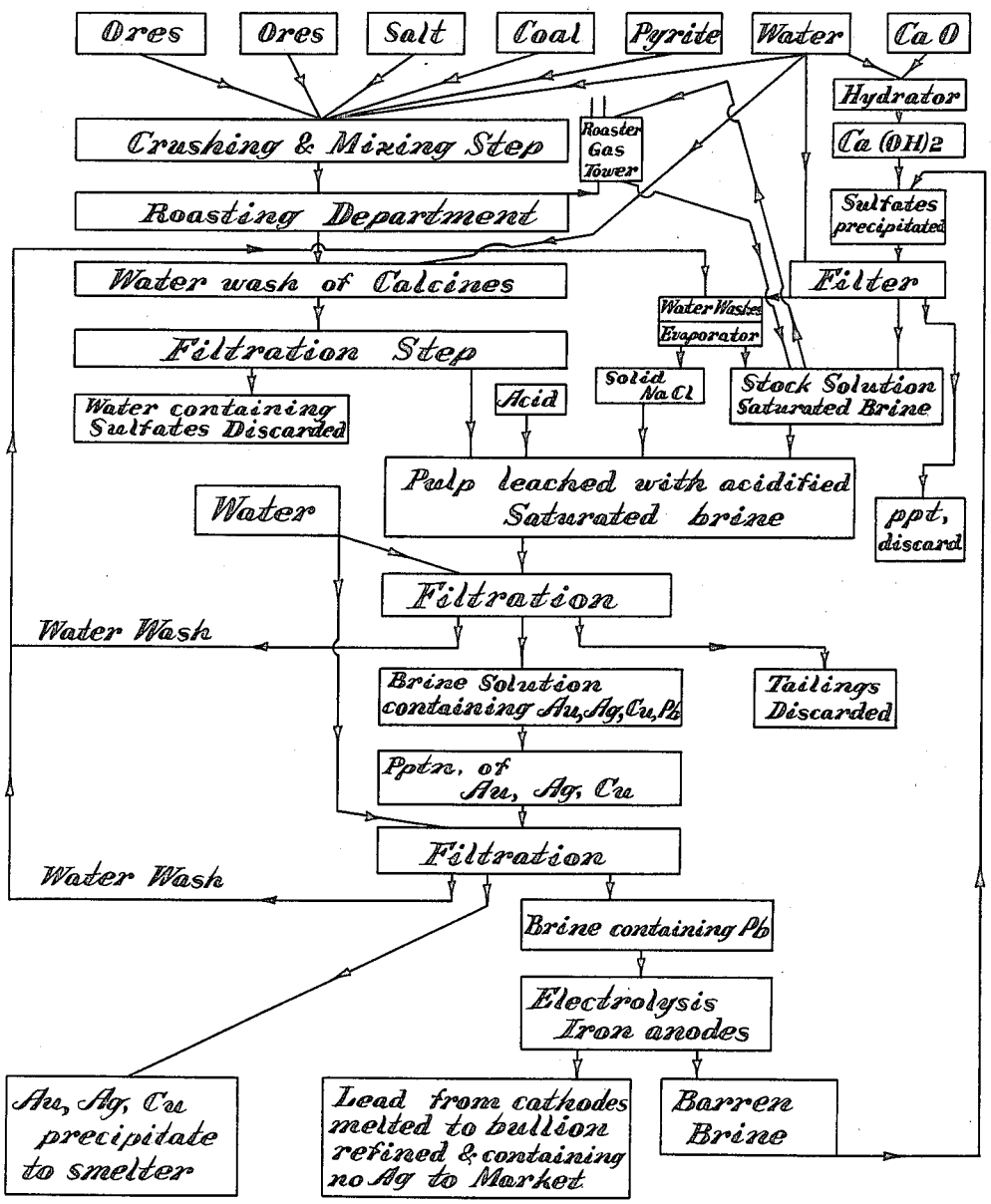

CLARENCE L. LARSON, OF KELLOGG, IDAHO, ASSIGNOR TO BUNKER HILL & SULLIVAN MINING & CONCENTRATING CO., OF SAN FRANCISCO, CALIFORNIA, A CORPORATION OF OREGON.

PROCESS FOR RECOVERING METALS FROM ORES.

1,284,910.

Specification of Letters Patent.

Patented Nov. 12, 1918.

Application filed April 30, 1917. Serial No. 165,393.

*To all whom it may concern:*

Be it known that I, CLARENCE L. LARSON, a citizen of the United States, residing at Kellogg, in the county of Shoshone and State of Idaho, have invented new and useful Improvements in Processes for Recovering Metals from Ores, of which the following is a specification.

This invention relates to a process for the extraction of copper, silver, gold and lead from ores, mill products, tailings, and the like, containing one or more or all of these metals, and pertains especially to ores containing lead in quantity especially desirable of extraction.

One of the objects of the invention is to chloridize or sulfatize by roasting the material to be treated and then to extract the metals contained by leaching with a brine solution. Another object of the invention is to precipitate the metals contained in solution preferably by separate precipitating steps, and finally to regenerate the barren brine to permit constant circulation or cyclic re-use of same. Further objects will hereinafter more fully appear.

The process, in general, requires first that the metal values be soluble or be made to be soluble in strong brine (NaCl-aqua) or in such brine when it is acidified. When this condition is fulfilled the material is leached with approximately saturated brine which is usually acidified. The insoluble residue is then filtered off, washed and discarded. The filtered effluent brine contains the extracted metals. From this solution all metals except lead, iron and zinc are precipitated and the solution is then clarified. This precipitated material which contains the silver, gold and copper, is marketed or treated locally by standard smelting and refining methods. The brine is next electrolyzed for its lead contents, the cathodic lead being melted down and marketed as refined lead. After the removal of the lead from the brine, the brine is reused for leaching. In this cyclic use of the brine for lixiviation it accumulates sulfates and such an accumulation up to even such a low amount as is represented by 10 gms. per liter of sulfur, renders the brine worthless as a lixiviant for lead values. Therefore the sulfates are eliminated by precipitation of the sulfate radical by means of some chemical agent and the filtering off of this precipitate. By this operation the brine is thoroughly regenerated and is then reused as lixiviant.

The following classes of material for example are available for this process:

1. Ores, mill and smelter products, tailings and the like containing the sulfates or chlorids or oxids or carbonates of lead; these are amenable directly to the leaching step.

2. Ores, mill and smelter products, tailings and the like, which contain lead sulfid; such ores are first roasted to transform the sulfid lead to oxid, sulfate or chlorid, and are then leached.

The invention, which is diagrammatically shown on the accompanying drawing, may be described in greater detail as follows:—

The ore is crushed to a suitable mesh, which may vary from $\frac{1}{4}''$ up to 30 mesh, although finer material present in any proportion of the total is not objectionable to the technique of the process. The crushing is done by dry methods, preferably, in order to eliminate the necessity of de-watering following a wet crushing. The crushed dry ore is mixed with the proper proportion of salt, each particular ore or mixture of ores having its own suitable proportion (this usually lies between the limits of 0 and 10%) either during the ore crushing stage or immediately subsequent to it. Although the use of any type of roasting furnace is permissible, economy recommends the use of some kind of blast roaster. In the event of using a blast type of roasting furnace, coal is admixed to the ore and salt in similar manners to those already described for the salt, the proportion of coal being determined in each case by the nature of the mixture to be roasted. The proportion usually lies between the limits of 0 and 3%.

Instead of utilizing coal, finely divided pyrite is capable of successful use, about 2% of the pyrite being equivalent in fuel value to 1% of coal. In the event that a hearth type of roaster be used, the salt addition may be made to some hearth secondary to that on which the primary introduction of ore is made. The ore-salt-coal mix is admixed with a quantity of water just sufficient to barely moisten each individual particle of the mass. 3 to 15% of water will be required for this purpose, the quantity varying for different meshes and with different gangue materials. Reactions occur during the roasting operation which result in metal compounds soluble in the process leaching agent or lixiviant.

The roasted material, or calcine, is or is not, according to economic conditions, then given a water wash in order to remove all water soluble sulfates. The water-washed material is then leached for its metal values by an approximately saturated aqueous solution of sodium chlorid. Inasmuch as an approximately saturated solution is required, the water-washed material is filtered to as low a moisture content as possible and solid salt is added to the brine leach to saturate any moisture remaining, if that amount of moisture be sufficient to dilute the approximately saturated brine to an appreciable extent. A saturated aqueous solution of sodium chlorid contains, approximately, 26% of sodium chlorid, the exact percentage varying with the temperature of the solution. The solubilities of the metal salts in the sodium chlorid solution increase directly with the temperature of the solutions and the sodium chlorid concentration.

Lead salts require an approximate saturation of the sodium chlorid solution in order to obtain a concentration of lead into solution of economic value. Copper and silver values extract well enough with solutions running 20 to 22% sodium chlorid, but lead requires a solution of 24% up to complete saturation. Ordinarily, ordinary mill temperatures would be used for solutions, although certain cases might warrant a maintenance of solutions at elevated temperatures.

Although any type of leaching apparatus is permissible, the low maximum lead concentration that is possible (approximately 15 to 17 grams per liter at ordinary temperatures of 15 to 25 degrees, centigrade) economically forces preference to the use of countercurrent work. The use of a small amount of acidity in the process lixiviant brine (hydrochloric or sulfuric acid) is permissible and advisable in order to transform any metal oxids which are insoluble in saturated brine, to soluble chlorids or sulfates. The nature of the metal recovery steps with their use of acid soluble precipitating agents makes preferable the use of only sufficient acid in the lixiviant to be entirely, or almost entirely, neutralized during the period of leaching contact with the pulp or calcine. The quantity of acid preferable for use is thus seen to be determined by the efficiency of the roasting step in forming as much of chlorid and sulfate metal compounds and as little of metal oxids as possible.

The above described leaching treatment is followed by filtration, this step providing a tailing which may be washed with water to reduce salt loss, and then discarded or otherwise treated for other metals. This water-wash is evaporated to saturation or sodium chlorid crystals, or both, which may be returned to the leaching system. The brine solution from this filtration contains gold, silver, copper and lead values in solution which may now be recovered. In order to obtain a product in the following lead precipitation step, which will yield refined lead, the brine solution from the leaching step is precipitated free of copper, silver, gold or any other metals which precipitate upon metallic lead. This precipitation is accomplished in one of several ways: the silver and gold are precipitated by bringing the solution in contact with copper; or the silver, gold, copper, etc., are similarly precipitated on iron or lead. If iron is used as precipitant all of the silver, gold, copper, etc., can be precipitated before an appreciable quantity of lead is also removed. As another alternative a soluble sulfid such as hydrogen or sodium sulfid may be used which when added in exactly proper amounts will precipitate all of the desired metals with but a very small accompanying removal of lead. Thus it should be understood that any method is permissible for precipitation of the indicated metals which will accomplish such precipitation completely without also removing any appreciable amount of lead, as the latter is to be recovered in its individual step.

The above precipitation step may be carried out for instance by a violent agitation for a short period of time, of the pregnant solution with finely divided or sponge iron. Iron filings are satisfactory. Iron sponge, resulting from electrolysis of ferrous sulfate between iron electrodes, is also satisfactory. Such a method of precipitation yields a high grade precipitate containing gold, silver and copper suitable for smelting. The brine solution now contains only lead values and is electrolyzed for the lead contents in cells utilizing iron anodes and iron or other suitable material for cathodes. A lead deposit is secured which is melted into refined bullion suitable for direct marketing. After the electro deposition of the lead the effluent electrolyte, or approximately saturated brine, is returned to a further leaching treatment of more calcines. Thus is indicated the cyclic nature of the leaching treatment, or rather the cyclic use of the lixiviant.

However, continued use of the lixiviant in such a cyclic manner degenerates its dissolving powers for the lead salts, due to the accumulation of sulfates in the solution. These sulfates immediately injure the lixiviant power of the brine and by the time they reach a concentration represented by 10 gms.

sulfur per liter, the brine is entirely worthless for leaching of lead values. Removal of the sulfate radical immediately regenerates the leaching power of the brine to its original degree. Such removal is usually required economically by the time the sulfates have reached a concentration represented by 6 grams per liter. Such removal is accomplished in several ways, i. e.

First: Calcium chlorid is added in suitable amount and the precipitate of calcium sulfate filtered off.

Second: Burned lime rock is slaked and the hydrated lime is added in suitable amount. The hydrated lime reacts with the ferrous chlorid of the solution (this ferrous chlorid having been formed by the solution of anode iron by the chlorin anion in the lead electrolytic deposition step) forming calcium chlorid and ferrous hydroxid. Continued agitation allows the calcium chlorid thus formed to precipitate out the sulfates as calcium sulfate. The iron-hydroxid-calcium-sulfate precipitate is then filtered off and the solution is suitable for re-use.

Third: The solution may be oxidized electrolytically between insoluble anodes and iron or other material cathodes with finely divided calcium carbonate maintained in a state of suspension in the electrolyte. Thus, as fast as ferric iron is produced it reacts with the calcium carbonate precipitating out ferric hydroxid and forming calcium chlorid, which, as before, precipitates out the sulfates. As before, the combined precipitate is filtered off and the solution returned in a regenerated condition to the leaching system. The building up of sulfate in the brine lixiviant, thus calling for the use of the regenerating agents, constitutes the reason why the water wash of calcines preliminary to the brine leaching may be of economic value in its minimizing the amount of sulfate that is allowed to enter the brine lixiviant. To indicate the extent of the value of the preliminary water wash it may be stated that it is usual to thereby dispose of 45% to 50% of the total brine soluble sulfate in the calcines.

The process as described is readily satisfied in apparatus requirements by mechanisms at present common to chemical and metallurgical practices, so no apparatus description is necessary to a description of the process.

As the reactions of chloridizing roasting are available in minute detail in text books and other literature, but a general statement of the important results effected which are of direct relation to the leaching work of this process is advanced. The roasting eliminates all of the carbon dioxid and part of the sulfur contained in the original ore; approximately - saturated - brine - soluble metal chlorids and sulfates, acid-brine-soluble metal oxids, sodium sulfate, manganese sulfate, etc., are formed.

The preliminary water wash removes the water soluble sulfates of sodium and manganese from the calcines by direct solution reactions. The preliminary water wash in dissolving sodium sulfate allows an instantaneous transformation of any lead chlorid in the calcine to lead sulfate.

$$Na_2SO_4 + PbCl_2 = 2NaCl + PbSO_4$$

Acid in the brine lixiviant transforms any metal oxids to the corresponding acid salts, and these salts are then soluble in the brine, together with the chlorids and sulfates formed in the roast.

Deposition of gold, silver, and copper on copper iron, and lead involves the use of the well-known chemical equivalent interchange reactions between metals precipitated and precipitating.

Electrolytic deposition of the lead involves another chemical interchange equation.

$$PbCl_2 + amperes = Pb \text{ on cathode} + Cl_2 \text{ anion}$$
$$Cl_2 \text{ anion} + Fe \text{ anode} = FeCl_2$$

The regeneration of the lixiviant by elimination of sulfates is explained by the following equations.

(First method):

$$CaCl_2 + Na_2SO_4 = CaSO_4 + 2NaCl$$

(Second method):

$$CaO + H_2O = Ca(OH)_2$$
$$Ca(OH)_2 + FeCl_2 = Fe(OH)_2 + CaCl_2$$
$$CaCl_2 + Na_2SO_4 = CaSO_4 + 2NaCl$$

(Third method):
Following the electrolytic oxidation of ferrous chlorid to ferric chlorid in the barren brine solution, the calcium carbonate suspension allows the following reactions to take place:

$$Fe_2Cl_6 + 3CaCO_3 = 3CaCl_2 + Fe_2(CO_3)_3$$
$$CaCl_2 + Na_2SO_4 = CaSO_4 + 2NaCl.$$

Having thus described my invention, what I claim and desire to secure by Letters Patent is—

1. A process of treating ores, mill or smelter products, tailings and the like containing lead sulfid to recover the metal values, which comprises converting the lead sulfid into lead compounds soluble in brine, leaching the resulting ore material with strong brine to dissolve said lead compounds, removing the lead from the brine solution, eliminating from the barren brine sulfates which may have accumulated therein to regenerate the dissolving power of the brine, and leaching further quantities of ore material with the regenerated brine.

2. A process of treating ores, mill or smelter products, tailings and the like containing lead sulfid to recover the metal values, which comprises converting the lead sulfid into lead compounds soluble in brine, leaching the resulting ore material with strong brine to dissolve said lead compounds, removing the lead from the brine solution by electrolysis, eliminating from the barren brine sulfates which may have accumulated therein to regenerate the dissolving power of the brine, and leaching further quantities of ore material with the regenerated brine.

3. In a process of treating ores, mill or smelter products, tailings and the like containing lead values, the steps which comprise leaching with strong brine an ore material containing the lead in a form soluble in said brine, removing the lead from the resulting brine solution, and regenerating the barren brine by eliminating therefrom the accumulated sulfates.

4. In a process of treating ores, mill or smelter products, tailings and the like containing lead values, the steps which comprise leaching with strong brine an ore material containing the lead in a form soluble in said brine, removing the lead from the resulting brine solution by electrolysis, and regenerating the barren brine by eliminating therefrom the accumulated sulfates.

5. A process of treating ores, mill or smelter products, tailings and the like containing lead and one or more of the metals copper, silver and gold, which comprises converting the metal values into a form soluble in brine, leaching the resulting ore material with strong brine to dissolve the metal values, removing the dissolved metal values other than lead from the brine by precipitation, and then removing the lead from the brine by electrolysis.

6. A process of treating ores, mill or smelter products, tailings and the like containing lead and one or more of the metals copper, silver and gold, which comprises converting the metal values into a form soluble in brine, leaching the resulting ore material with strong brine to dissolve the metal values, removing the dissolved metal values other than lead from the brine by precipitation, removing the lead from the brine by electrolysis, eliminating from the barren brine sulfates which may have accumulated therein, and leaching further quantities of ore material with the regenerated brine.

7. A process of treating ores, mill or smelter products, tailings and the like containing lead sulfid to recover the metal values, which comprises converting the lead sulfid into lead compounds, soluble in brine, washing with water to remove water soluble compounds and then leaching the resulting ore material with strong brine to dissolve said lead compounds, removing the lead from the brine solution, eliminating from the barren brine sulfates which may have accumulated therein to regenerate the dissolving power of the brine, and leaching further quantities of ore material with the regenerated brine.

8. A process of recovering lead from ores, mill or smelter products, tailings and the like in which the lead is present in a form soluble in brine, which comprises leaching the ore with strong brine, and subjecting the brine solution, after a suitable preliminary treatment thereof to eliminate interfering metals, to electrolysis to remove the lead therefrom.

9. A process of treating ores, mill or smelter products, tailings and the like containing lead sulfid to recover the metal values, which comprises roasting the ore to produce salts of the metal values, leaching the roasted ore with brine which contains acid when some of the metal values are present as oxids, and precipitating the metal values from the brine solution.

10. A process of treating ores, mill or smelter products, tailings and the like containing lead sulfid to recover the metal values, which comprises roasting the ore to produce salts of the metal values, leaching the roasted ore with brine which contains acid when some of the metal values are present as oxids, precipitating the metal values from the brine solution, regenerating the brine by eliminating sulfates therefrom, and leaching further quantities of ore with the regenerated brine.

11. A cyclic process of recovering lead, copper, gold and silver from ores, mill or smelter products, tailings and the like in which the metals named exist as oxids, or carbonates, or chlorids or sulfates, which consists in leaching them with strong brine, neutral if no oxidized metals are present and acidified, if they are present, with hydrochloric or sulfuric acids; filtering off the insoluble residue, washing the same to recover entrained sodium chlorid, precipitating the copper, silver and gold values from the filtered lixiviant and removing them by filtration; then removing the lead from the solution by electrolysis, regenerating the brine by precipitation and removal of the sulfates and then leaching further quantities of ore with such regenerated brine.

12. A method of recovering metals from lead sulfate ores which consists in reducing the ore to a suitable mesh, roasting the ore to convert the metal values into a form soluble in brine, leaching the ore with a brine solution to dissolve the metal contents, precipitating and removing the metal from the solution, then regenerating the solution by precipitating as insoluble sulfates whatever sulfur in the form of sulfates is dissolved during the leaching operation, and removing the same to permit re-use of the brine.

13. A method of recovering metals from ores containing one or more of the metals lead, copper, silver, and gold, which consists in reducing the ore to a suitable mesh, adding salt to the reduced ore, roasting the ore, leaching the ore with a brine solution to dissolve the metal contents, preciptating and removing the metal from the solution, then regenerating the solution by precipitating as insoluble sulfates whatever sulfur in the form of sulfates is dissolved during the leaching operation, and removing the same to permit re-use of the brine.

14. The process of treating sulfid ores, mill products, mill tailings, and the like, containing lead sulfids, which comprises roasting them to convert the metal values into a form soluble in brine, the leaching from the roasted ore of the gold, silver, copper and lead values with an approximately saturated aqueous sodium chlorid solution, the recovery of the gold, silver, and copper values by metal precipitation, the electrolytic recovery of the lead utilizing iron anodes, and a cyclic use of the saturated aqueous solution of the sodium chlorid made possible by the regeneration of the solution.

15. The process of treating oxidized ores, mill products, mill tailings, and the like, containing lead oxids, lead chlorids or lead sulfates, which comprise the leaching of the gold, silver, copper and lead values with an approximately saturated aqueous sodium chlorid solution, the recovery of the gold, silver, and copper values by metal precipitation, the electrolytic recovery of the lead utilizing iron anodes, eliminating sulfates from the remaining brine, and leaching further quantities of ore, tailings and the like with the regenerated saturated aqueous solution of the sodium chlorid.

In testimony whereof I have hereunto set my hand in the presence of two subscribing witnesses.

CLARENCE L. LARSON.

Witnesses:
W. W. HEALEY,
M. E. EWING.